(12) United States Patent
Michael

(10) Patent No.: US 9,092,570 B2
(45) Date of Patent: Jul. 28, 2015

(54) MEMORY MANAGEMENT FOR REMOTE SOFTWARE DEBUGGERS AND METHODS

(76) Inventor: Sam Michael, Mill Creek, WA (US)

( * ) Notice: Subject to any disclaimer, the term of this patent is extended or adjusted under 35 U.S.C. 154(b) by 1248 days.

(21) Appl. No.: 11/829,899

(22) Filed: Jul. 28, 2007

(65) Prior Publication Data

US 2009/0031289 A1     Jan. 29, 2009

(51) Int. Cl.
*G06F 9/44* (2006.01)
*G06F 11/36* (2006.01)

(52) U.S. Cl.
CPC .................................. *G06F 11/3656* (2013.01)

(58) Field of Classification Search
USPC .......................................................... 717/124
See application file for complete search history.

(56) References Cited

U.S. PATENT DOCUMENTS

| | | | |
|---|---|---|---|
| 5,682,472 A * | 10/1997 | Brehm et al. | 714/25 |
| 6,314,530 B1 * | 11/2001 | Mann | 714/38.11 |
| 2002/0044484 A1 * | 4/2002 | Tomita | 365/185.05 |
| 2003/0004671 A1 * | 1/2003 | Minematsu | 702/123 |
| 2003/0233634 A1 * | 12/2003 | Carrez et al. | 717/124 |
| 2006/0112310 A1 * | 5/2006 | McHale et al. | 714/15 |
| 2006/0277435 A1 * | 12/2006 | Pedersen et al. | 714/30 |

OTHER PUBLICATIONS

ChorusOS features and architectures overview,Dec. 2001, Version 5 http://www.leonard.nom.fr/publications/chorus/COSDESPERF. pdf, 224 pages.*
Emutec,"What is new", Jun. 24, 2006,www.emutec.com, p. 1-3.*
Motorola, "Motorola's Multi-processing Verification Platform", Nov. 2001, Motorola, p. 1-22.*
PROMJet, "PROMJet In-Circuit Emulator", May 2, 2006, http://web.archive.org/web/20060502050546/http://www.emutec.com/pjetmain.html, p. 1-4.*
Son, Son "Debugging Protocol for Remote Cross Development Environment", 2000, p. 394-398.*

* cited by examiner

*Primary Examiner* — Li B Zhen
*Assistant Examiner* — Duy Khuong Nguyen

(57) ABSTRACT

During software development for embedded systems, it is very common to use a remote debugger to debug the software applications. In such a debugging environment, the debugger will be running on a remote computer and the application under development will be running on the embedded system. The debugger will be connected to the embedded system via a software link or a hardware emulator. During the debug process, it is desirable to access various memory blocks in the embedded system in different ways. An example would be to enable or disable CPU cache during memory access for a specific address range. Another example would be the ability to designate a memory block as a flash memory to allow the use of a programming algorithm. This feature is addressed by adding a Memory Access Table (MAT) from a configuration file or compiler output to the debugger, emulator or debug monitor.

7 Claims, 6 Drawing Sheets

| Memory address | Memory Length | Memory Features |
|---|---|---|
| 0x00000000 | 0x00200000 | Flash, Disable Cache |
| 0x00400000 | 0x00800000 | CODE, Disable DATA Cache when Writing |
| 0x01000000 | 0x01000000 | DATA, Read through Data Cache |
| 0x04000000 | 0x02000000 | CODE, Hardware break points |
| 0x80000000 | 0x01000000 | Dual-port memory emulator. |
| 0xF0000000 | 0x10000000 | I/O Space, Disable Cache for reads |
|  |  |  |

FIG. 5

MEMORY MANAGEMENT FOR REMOTE SOFTWARE DEBUGGERS AND METHODS

BACKGROUND OF THE INVENTION

1. Field of the Invention

This invention pertains to software debuggers used to debug applications running on remote computers and, more particularly, to the way these debuggers manage, access and view memory regains used by the software applications on the remote computers.

2. Description of the Related Art

Embedded computers are being used in a variety of applications ranging from home appliances to aircraft control. Since these computers are mainly used to control a variety of equipment, they do not have a keyboard or a video display such as used with personal computers. In most cases these computers would have a limited number of keys or sensors for inputs and some light indicators (LED) or a small display screen for outputs. During the development of software or firmware applications for these computers, the developers tend to use a host computer, which is normally a PC or a work station, to run the software debugger to develop the applications. This concept is normally called software remote debugging since the debugger is running on the host computer and the application is running on the embedded computer which is also referred to as the target system. During the debug process, the debugger that is running on the host computer would be connected via a debug link to the application that is running on the embedded computer. This debug link is normally used to download the application, read and write memory locations and CPU register information on the remote computer. It is also very common to use an emulator to make the connection between the host computer and the target system. The emulator would normally connect to the host computer via a USB, Ethernet or similar connection and to the embedded computer via a JTAG or a similar type of debug ports. The emulator would use the debug port to control the application execution and access the target system resources.

During the software development process, it is very useful to have the ability to access the application memory space in different ways. One example is the way to handle the CPU cache system during memory access. In such example, the debugger can view the memory as it is stored in the CPU cache or as it is stored in the system memory outside the CPU. Another example is the way data gets written into the memory space. The debugger can request the data to be written directly to the memory after switching the CPU data cache off or written first to the CPU cache and then forwarded to the main memory.

The target system would normally have a memory management system (MMU) to manage cache support but target application cache setup does not always match the debugger requirements.

Another situation is when writing FLASH memory. Unlike random access memory, the system has to use an algorithm to write the FLASH memory. In the prior art, the user has to engage a FALSH programmer to program the FLASH memory during application download and then engage the debugger. If the debugger has the FLASH address information, it can engage the FALSH writing algorithm when it needs to write the flash memory during a debug session.

Providing the debugger with such information is very helpful during debugging. This will allow the user to access different blocks of memory in the target system in different ways. This helps the user of the debugger to view and get the information needed without having to call multiple applications or adjust the MMU unit in the target system to access specific memory reigns in different ways and then readjust the MMU parameters for the system to continue execution after accessing the data.

SUMMARY OF THE INVENTION

It is an object of the present invention to add a table that provides additional information for a number of memory blocks that needs to be accessed in different ways. The table can be accessible to the debugger, emulator or the debug monitor during the debug session. The table contents can be added via a text edited files, extracted out of the object file generated by the compiler or from other sources at the begging of the debug session. This will allow the debugger to have the extra information needed to handle memory access in a way to view the needed information or to use the correct algorithm to write a specific flash memory.

The memory access table (MAT) would contain addressing information to show the start of the memory block and its length or optionally the end address of the memory block. It will also include various flags to show various features such as cache handling, flash algorithm, type of breakpoints usable in this memory space and other feature that varies between memory locations.

BRIEF DESCRIPTION OF THE DRAWINGS

FIG. 5 is an example of a memory table with valid memory information.

DESCRIPTION OF THE PREFERRED EMBODIMENT(S)

Figure 1:
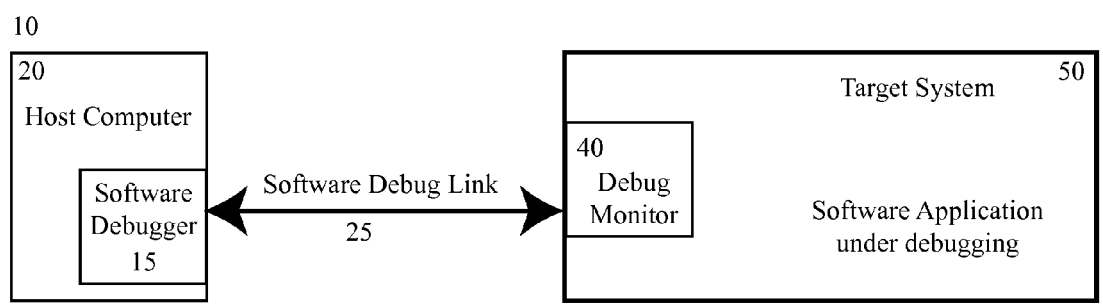
FIG. 1 is a debugging system as found in the prior art using a software link.

Referring to the accompanying FIG. 1, there is shown and described a remote debugger system (10) used to debug hardware, software and firmware applications. The debugger (15) is running on a host computer such as a PC or a workstation (20). The software application being debugged is running on a remote or target system (50). The host computer is connected to the target system via a software debug link using a USB, serial or Ethernet connection (25). In this case the debugger communicates with a software debug monitor running on the target system (40). The debugger sends various debug requests to the debug monitor which in turn executes them and sends the results back to the debugger.

Figure 2:
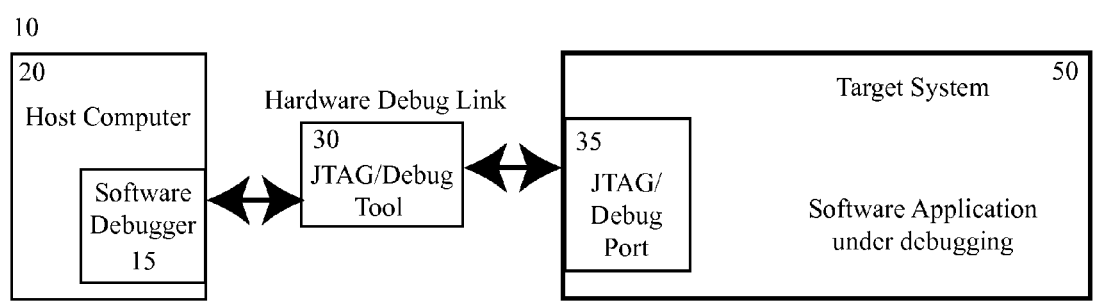
FIG. 2 is a debugging system as found in the prior art using a hardware emulator.

FIG. 2 shows the setup if the host computer is connected to the target system using a debug tool such as a JTAG emulator (30). The debugger communicates with the tool via a USB, serial, Ethernet or similar link. The emulator is connected to the target board via a debug port (35) that allows it to access all board recourses such as memory and register contents. It also allows it to run or stop the CPU to control the software execution. Once the debugger sends a debug command to the emulator, it starts a series of functions on the debug port to execute the command. At the end, it sends a response to the debugger.

In the case of the prior art, the debugger operator has to adjust target system parameters to access a given memory location in a specific way. This adds to the complexity of the debugging process.

Figure 3:
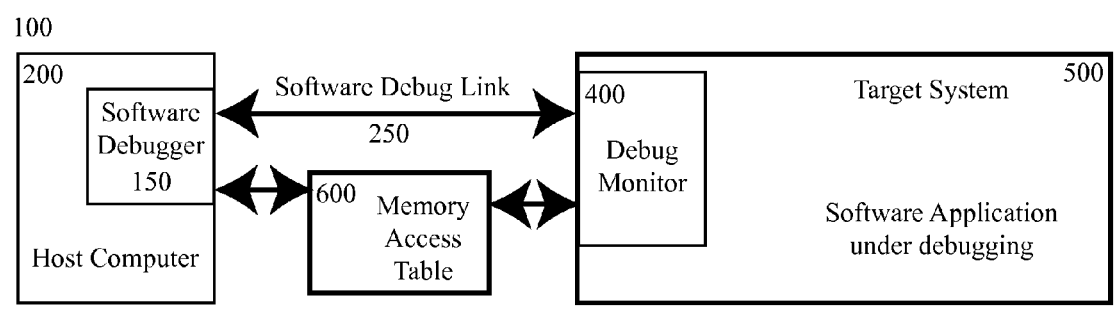
FIG. 3 is a debugging system that uses the memory access table with a software link.

Referring to the accompanying FIG. 3, it shows a debugging environment using the Memory Access Table (MAT) disclosed herein. It shows the debugging setup using a software link between the host computer and the target system. The Memory Access Table can be either accessible by the debugger or by the debug monitor or both. It can be set and modified at any time during the debug session and then used during the debugging to allow for different ways to access the memory. If the MAT is built-in the debug monitor, it can be downloaded from the debugger when initiating the debug session.

Figure 4:
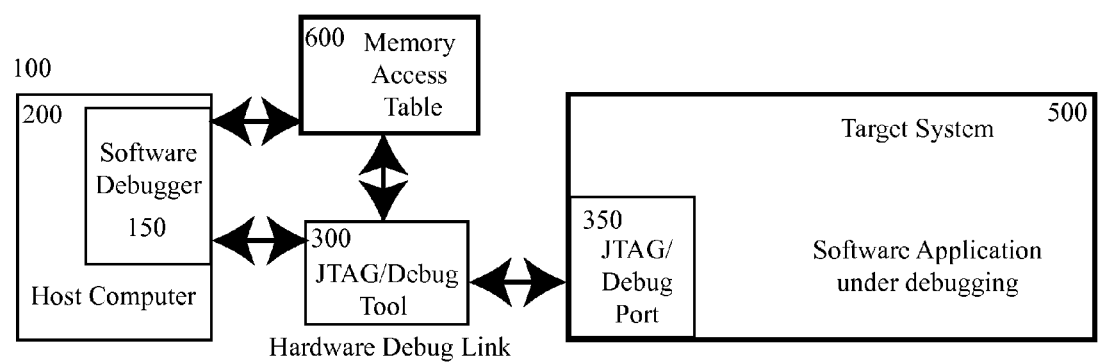
FIG. 4 is a debugging system that uses the memory access table with a hardware emulator.

FIG. 4 shows a setup using a Memory Access Table with a hardware emulator to facilitate the debugging. In such a cease, the table can be accessible by the debugger, hardware emulator or both. It can also be downloaded from the debugger to the emulator tool to handle memory accesses in different ways for different memory blocks.

FIG. 5 shows an example to such a Memory Access Table. It shows various memory sections and the length of each section. Optionally it can provide the start address and end address of the memory block. Additionally the MAT will provide information of how to handle the memory accesses to the various memory blocks. For example the first entry shows that the location of address 0-0x200000 is a FLASH memory. The table can optionally state the type of the flash memory or the programming algorithm used to program it. It also instructs the emulator to disable the cache memory when accessing this memory address range for the programming algorithm to work correctly.

The second entry indicates that the address range is used for code storage and therefore the data cache should be disabled when writing this address range. The third entry shows that address space 0x1000000 to 0x2000000 is for data storage and it needs to be accessed using the cache memory if the CPU has it enabled.

Entry 4 is to allow the JTAG emulator to use only hardware breakpoints in this address space. If the debugger instructs the emulator or the debug monitor to set a breakpoint, it will set a hardware breakpoint instead of using a trap instruction or a software breakpoint for this memory region.

The target system uses a dual-ported Memory emulator which is located at address 0x80000000 and has a memory capacity of 16 MByte as stated in entry 5. It is connected to the JTAG debug tool via a link, such as USB, and is accessible by the debug tool using that link without using the JTAG port of the CPU. The memory emulator is connected to the CPU address, data and control bus and its memory space is fully accessible by the CPU. Since the emulator memory is dual ported, it can be accessed from the debug tool and the target CPU simultaneously. This can give the debugger the ability to access memory contents inside the memory emulator without stopping the CPU for an on-the-fly memory access. Entry 5 instructs the debug tool to use the memory emulator link for the specified address space instead of using the JTAG link.

Memory space at location 0xF0000000 to 0xFFFFFFFF is designated as input and output I/O space in MAT entry 6. It should be accessed with the cache memory disabled to allow the debugger to read and write the data available on the ports instead of the data in the cache memory.

Figure 6:
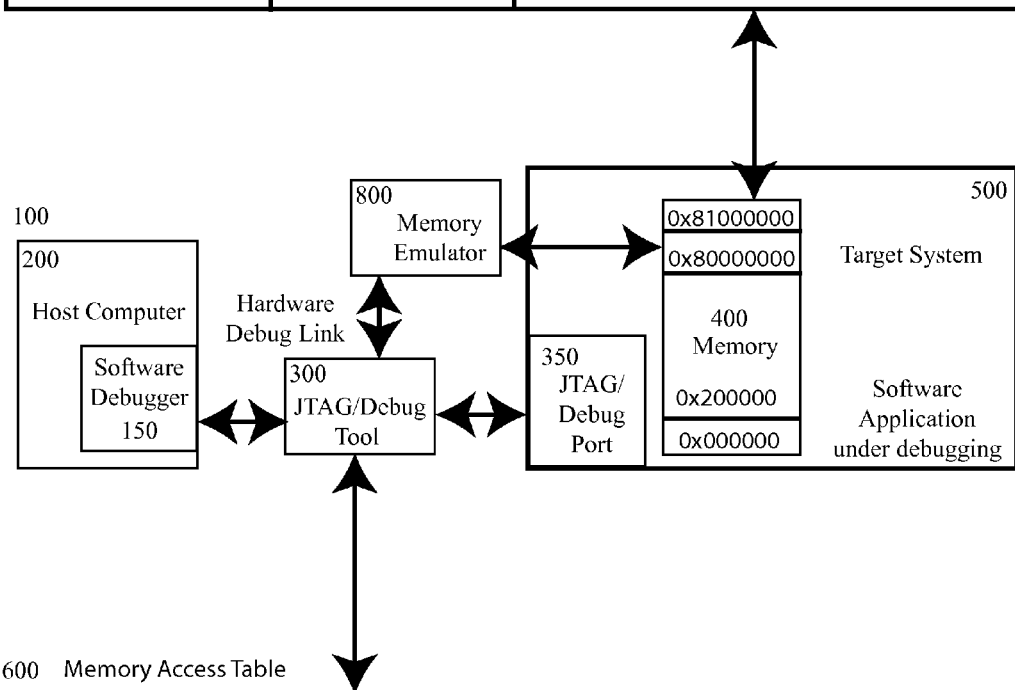
FIG. 6 is an example of a debugger system using a Memory Access Table and a MMU.

To understand the working of the memory access table, an example is presented for a remote debugger using a JTAG emulator with an attached memory emulator. The debugger setup uses a memory access table which is connected to the JTAG emulator only. The setup of the system under debugging is presented in FIG. 6. The memory management unit MMU (700) as well as the Memory Access Table (600) entries for the relevant address spaces is presented. The address space 0x00000000-0x00200000 is setup for FLASH memory access to store the boot code for the CPU after a power-up reset. Address space 0x80000000 to 0x81000000 is setup to access the memory emulator.

The JTAG emulator is also connected to a dual-ported memory emulator that allows simultaneous access to the memory from the CPU of the target system as well as the debug tool. The debugger is instructing the debug tool to use the memory emulator link when accessing memory space 0x8000000 to 0x81000000 instead of using the JTAG link to access the memory emulator address space when the target CPU is not in stop mode as stated in the MAT.

Since the JTAG emulator needs to disable the CPU cache memory when programming the Flash memory, the MAT entry states that the Data cache is disabled. The MAT also states that the FLASH memory uses the AMD programming algorithm. It also instructs the emulator to use hardware break points in this memory region instead of the software breakpoints or trap instructions. Once the debugger instructs the emulator to set a breakpoint during the debug process, it uses a hardware breakpoint.

Additionally the table can specify whether to use virtual or physical address space to address the memory by enabling or disabling the memory management unit of the CPU. It also can provide the width of the memory access such as byte, short, word or double word when the debugger access the memory block. Also the type of memory used such as SRAM, DRAM, SDRAM or FALSH can be specified in the table. This will help define the access method for the various memory blocks and possibly any initial setup needed at reset.

The memory table can provide info of how to handle little Endean and big Endean data access. Memory blocks can be marked as code or data spaces in the memory table as well. This will allow the emulator to access the memory space in the most efficient way.

The table information can be extracted from compiler output information and a text input file added by the user. The debugger can download the table to the emulator to use it during debugging. It can be stored in text, binary or any other format usable by the debugging system.

In compliance with the statute, the invention described herein has been described in language more or less specific as to structural features. It should be understood; however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A remote debugging system, comprising:
   A. a host computer system running a debugger software capable of debugging a remote computer system by accessing and controlling its processor and memory devices;
   B. a remote computer system comprising processor, one or more memory devices; under debugging by said debugger on the host computer system;

C. a debug tool connected to said debugger on the host computer system capable of executing debug commands issued by said debugger; said debug tool is connected to the target system via a debug port capable of accessing, stopping, starting and controlling instruction execution on controlling said remote computer system; and, D. a memory access table accessible by said debug tool and providing addressing and size information to specify various sections of said remote computer system memory;

wherein said memory access table mandates the debug tool to add a hardware breakpoint to a memory address inside a memory section in the remote computer memory specified by said memory access table upon debugger request to add a software breakpoint to said memory address.

2. The remote debugging system, as recited in claim 1, wherein the memory access table contains additional information to state the enablement of said remote computer system processor cache memory during memory access operation by said debug tool to a memory address inside a memory section in the remote computer system memory specified by said memory access table instead of using the cache memory control provided by remote computer system processor memory management mechanism for said memory section.

3. The remote debugging system, as recited in claim 1, wherein the memory access table contains additional information to state the size of remote computer processor data bus used by said debug tool during debugger memory access operation to a memory address inside a memory section in the remote computer system memory specified by said memory access table instead of using the data bus size provided by remote computer system processor memory management mechanism for said memory section.

4. The remote debugging system, as recited in claim 1, wherein the memory access table contains additional information that state the type and programming algorithm for a flash memory device used in a memory section in the remote computer system memory specified by said memory access table allowing said debug tool to program said flash memory device upon debugger request to write a memory address inside said memory section by changing the memory write algorithm used by said debug tool based on the remote computer system memory address being written to.

5. The remote debugging system, as recited in claim 1, wherein said memory access table is also accessible by said debugger software on the host system.

6. The remote debugging system, as recited in claim 1, wherein the memory access table contains additional information to state the ability of accessing a memory address inside a memory section in the remote computer system memory specified by said memory access table by said debug tool without stopping remote computer system processor code execution.

7. The remote debugging system, as recited in claim 1, wherein the memory access table contains additional information to state the remote computer code and data address space for a memory address inside a memory section in the remote computer system memory specified by said memory access table instead of using the definition in the remote computer system processor memory management mechanism during debug tool access to said memory section.

\* \* \* \* \*